(12) United States Patent
Nayak et al.

(10) Patent No.: US 12,411,389 B1
(45) Date of Patent: Sep. 9, 2025

(54) CAMERA PRIVACY SHUTTER

(71) Applicant: Podium Fit, Inc., San Francisco, CA (US)

(72) Inventors: Subrat Nayak, San Francisco, CA (US); Erik Aylen, Bozeman, MT (US)

(73) Assignee: Podium Fit, Inc., San Francisco, CA (US)

( * ) Notice: Subject to any disclaimer, the term of this patent is extended or adjusted under 35 U.S.C. 154(b) by 10 days.

(21) Appl. No.: 18/213,232

(22) Filed: Jun. 22, 2023

Related U.S. Application Data

(60) Provisional application No. 63/355,435, filed on Jun. 24, 2022.

(51) Int. Cl.
G03B 9/46 (2021.01)
G03B 9/36 (2021.01)

(52) U.S. Cl.
CPC .................. *G03B 9/46* (2013.01); *G03B 9/36* (2013.01)

(58) Field of Classification Search
CPC .......... G03B 9/46; G03B 11/043; G03B 9/36; G03B 11/04; G03B 11/041
See application file for complete search history.

(56) References Cited

U.S. PATENT DOCUMENTS

| | | | | |
|---|---|---|---|---|
| 3,927,415 A | * | 12/1975 | Petersen | G03B 7/081 396/450 |
| 4,024,552 A | * | 5/1977 | Kondo | G02B 5/005 396/464 |
| 4,286,856 A | * | 9/1981 | McGrath | G03B 9/46 396/335 |
| 8,724,020 B1 | * | 5/2014 | Haddad | G03B 11/041 348/375 |
| 8,988,532 B2 | | 3/2015 | Soffer | |
| 9,179,105 B1 | | 11/2015 | Zeira et al. | |
| 10,455,670 B2 | | 10/2019 | Zeira et al. | |
| 11,256,159 B2 | | 2/2022 | Clark et al. | |

* cited by examiner

*Primary Examiner* — Christopher E Mahoney
(74) *Attorney, Agent, or Firm* — Schwegman Lundberg & Woessner, P.A.

(57) ABSTRACT

A camera comprises a camera lens, a privacy shutter movable between a first position in which it obstructs the camera lens and a second position in which the camera lens is exposed, and a spring that biases the privacy shutter towards the first position. A piece of magnetic material is coupled to the privacy shutter, and an electromagnet is operable to hold the privacy shutter in the second position by acting on the piece of magnetic material. The camera may further comprise a switch located on the camera to deenergize the electromagnet.

8 Claims, 7 Drawing Sheets

CAMERA PRIVACY SHUTTER

RELATED APPLICATION DATA

This application claims the benefit of U.S. Provisional Patent Application No. 63/355,435 filed on Jun. 24, 2022, the contents of which are incorporated herein by reference as if explicitly set forth.

TECHNICAL FIELD

This patent application generally relates to the field of digital cameras. More specifically, this patent application relates to a privacy shutter for use in a digital video camera.

BRIEF DESCRIPTION OF THE SEVERAL VIEWS OF THE DRAWINGS

Some examples of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

FIG. 9 illustrates a system including an exercise device, a server, and various client devices according to some examples.

FIG. 10 is a flowchart illustrating a method of operating a camera according to some examples.

DETAILED DESCRIPTION

Figure 1:
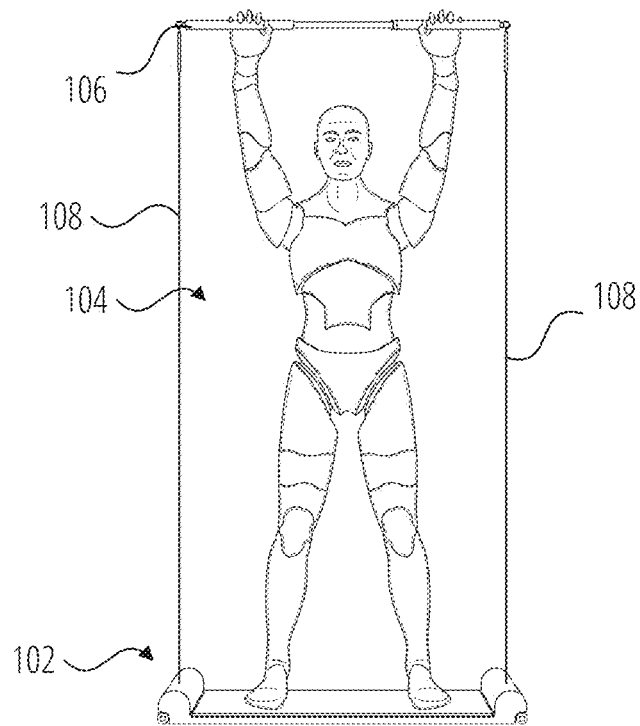
FIG. 1 illustrates a user exercising using a cable-based exercise device.

FIG. 1 illustrates a user exercising using a cable-based exercise device 102. As can be seen, a user 104, standing on a platform of the exercise device 102 can grasp and raise and lower a bar 106 that is urged downward by cables 108 driven by motors in the exercise device 102. The exercise device 102 permits a user to perform a number of exercises traditionally associated with free weights.

Figure 2:
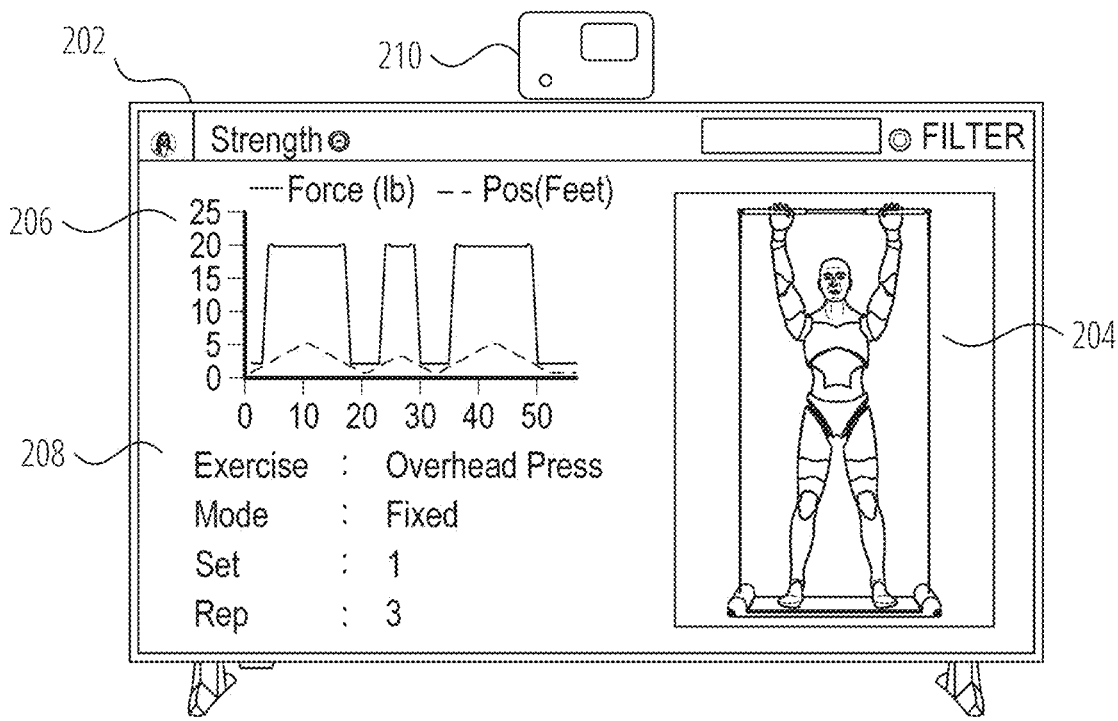
FIG. 2 illustrates a display that may be shown on a related display device during use of the exercise device, according to some examples.

FIG. 2 illustrates a display that may be shown on a related display device 202 during use of the exercise device 102, according to some examples. The display includes a window with a video feed 204 from a camera 210 located in or on the display device 202 and pointed at the user, so that they can monitor their form during the exercise. Alternatively or in addition, a feed from the camera 210 can be provided to a remote instructor, a friend or a joint exercise class. The display also includes a chart 206 showing the height of the bar 106 over time, as well as a display of the force applied to the bar over time. The display also includes a status display 208 that shows the selected exercise, the exercise mode (such as fixed force or height or speed adaptive), the number of sets of the exercise that have been done in the current session, and the number of repetitions done in the current set of the exercise. The exercise device 102, display device 202 and camera 210 may be part of a system 900 as described below with reference to FIG. 9.

The display device 202 very convenient for display of content and/or feedback, and as user interface for the exercise device 102. The exercise device 102 can connect to a smartphone over Wi-Fi or Bluetooth, but the display screen of a phone is too small to see unless it is held in a user's hand close to their face. Most people have a TV in their house, which is often enabled with a smart computer inside the TV, or an external set-top set top box 908 that sends display data out on an HDMI connection to the TV screen. A TV screen can conveniently function as the display device 202.

Such smart TV or set-top boxes also have Bluetooth and Wi-Fi connectivity and use a remote control for user inputs. This can provide a convenient setup with which to use the exercise device 102. A user may want to see themselves while performing an exercise or may want to enable a remote exercise trainer/coach to look at them, to either guide, teach or monitor their form during the exercise, or have a video communication to discuss various aspects of their training program. The camera 210 is required to enable such a video communication, which can be plugged into the USB port of the smart TV or the set-top box.

USB cameras don't typically have a good and secure privacy shutter for such a circumstance, particularly if the exercise device 102 is used in the user's living room, which is typically where a large screen TV will reside. The camera stays connected to the TV at all times and even if the TV display is disabled, a processor of the set top box 908 may stay powered and connected to the Wi-Fi network. If a hacker manages to hack into the user's Wi-Fi network, they may be able to use the set-top set top box 908 to access the camera and to look into the user's home without turning on the TV display. Despite many advances in cyber security, users are often afraid of being hacked in this manner.

Some cameras have a mechanical privacy shutter that is opened and closed manually by the user. This provides good security when it is closed since the user is required to open the shutter before exercising because otherwise only a blank video feed will be provided if the camera is enabled. It is however difficult to ensure the user closes the shutter at end of its intended usage. When closed, this arrangement is very secure, and a hacker cannot see into the home even if they manage to hack in, because the lens is covered physically by an opaque barrier. Such a privacy shutter suffers from the disadvantage that a user may forget to close the shutter at end of the camera's intended usage, because they are usually thinking about the next task, which is not hindered by them not closing the camera privacy shutter.

The camera 210 addresses this problem by having a shutter that needs to be opened manually when the camera is to be used, but that will or should automatically close at end of the intended usage event. The manual process makes sure a hacker can never view the field of view of the camera 210 when the shutter is closed, since such a manual shutter opening step cannot be automated or driven by electronics that a hacker can access through the camera or other software. The automatic closure at the completion of the intended usage makes sure that the user never forgets to close the shutter. Such a secure privacy shutter can inspire confidence in users to allow such a camera in their living room that is connected to their smart tv or smart set-top box.

Figure 3A:
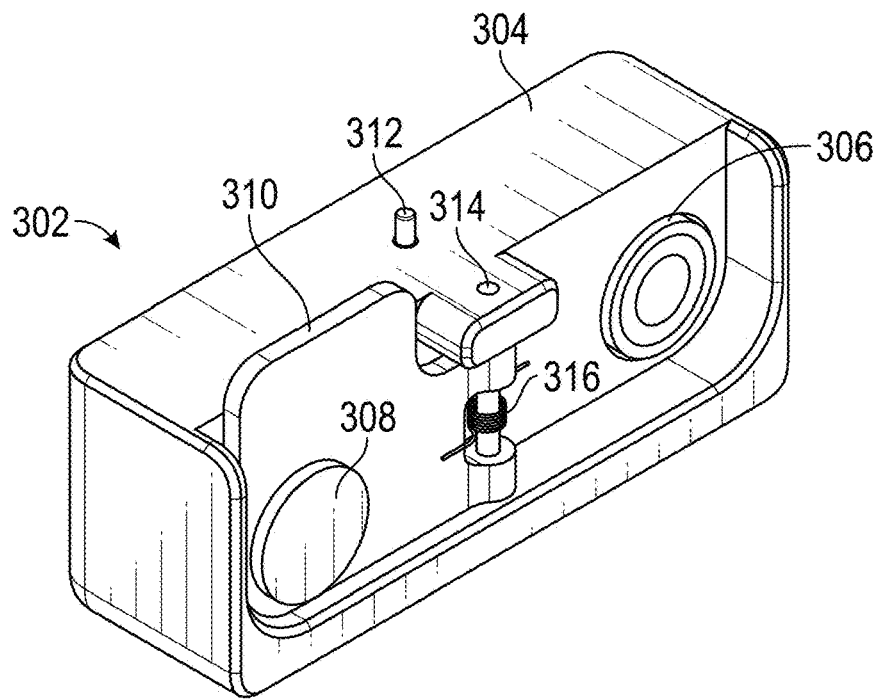
FIG. 3A and FIG. 3B illustrate two perspective views of a camera, according to some examples.
Figure 3B:
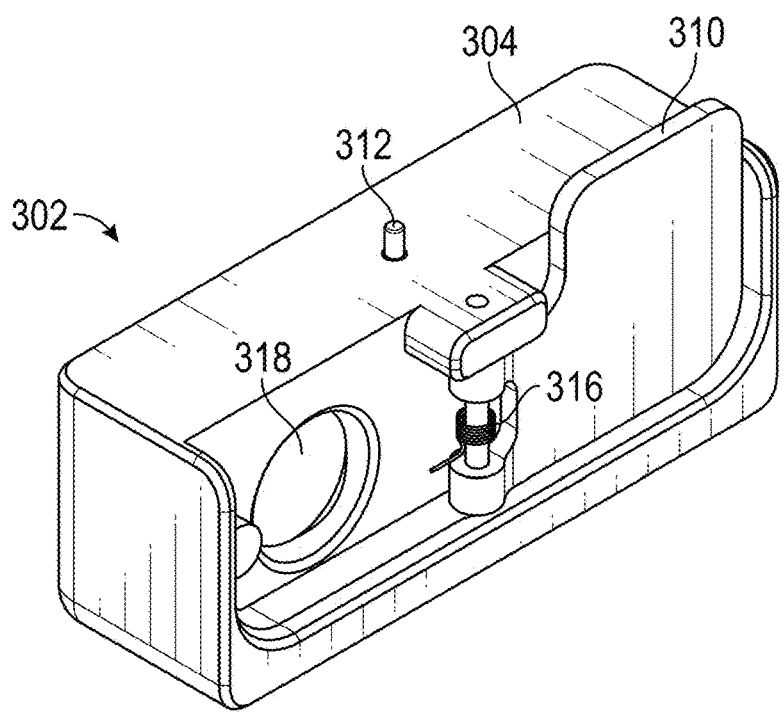

FIG. 3A and FIG. 3B illustrate two perspective views of a camera 302 according to some examples. The camera 302 includes a body 304, an electromagnet 306, a disc of magnetic material 308 mounted to one side of a privacy shutter 310, a release button 312, a rod 314 about which the privacy shutter 310 rotates in use between a camera shielding position illustrated in FIG. 3A and an open position in which a camera lens 318 is exposed. The privacy shutter 310 is biased towards the closed position by a rotary spring 316.

When the camera 302 is in use, the privacy shutter 310, after being opened manually to the open position shown in FIG. 3B, is held in place by the electromagnet 306, which is activated by a solenoid. Such an electromagnet 306 has a copper coil around an iron core and an iron chassis, which functions like a magnet that can be turned on and off if the coil is energized or de-energized respectively. The magnetic material 308, such as a ferromagnetic material like an iron, can be aligned with the core and chassis of the electromagnet 306, to create a path of least reluctance that holds the magnetic material 308 and thus the privacy shutter 310 in place.

When it is time to turn the camera 302 off, that is at end of its intended usage, the user will typically turn the application off or the application can auto turn itself off is the user has not accessed it for certain time. Also, the application can turn the camera 210 off when a certain event is completed, such as a power down of the exercise device 102 or the termination of a video call or the expiry of a timer. This will stop the camera feed, which is usually indicated with an LED turning off, but relying solely on an LED to monitor camera operation is not ideal, because it can potentially be disabled by a hacker when accessing a camera.

In the current case, as soon as the camera 302 is turned off by the software, the solenoid is de-energized and the current provided to the electromagnet 306 is removed. This releases the privacy shutter 310, which was being held in place by the interaction of the electromagnet 306 and the magnetic material 308. The spring 316 then pulls the privacy shutter 310 back to a closed state that physically covers the camera lens 318 as shown in FIG. 3A, as soon as the solenoid is de-energized.

There is no way, apart from manual action by the user, to open the privacy shutter 310 to expose the camera lens 318. When the camera 302 is not ready for use, opening the privacy shutter 310 doesn't hold it open as the solenoid (and thus the electromagnet 306) stays de-energized, and the biasing action of the spring 316 pulls the shutter back to closed. If the camera is ready for use (for example if the user has started the relevant application and/or initiated a video-appropriate session in the relevant application), and the solenoid is energized by the camera firmware, opening the privacy shutter 310 will hold it in place by the attraction between the energized electromagnet 306 and the magnetic material 308 overcoming the force of the spring 316. The current in the solenoid is driven by a MOSFET switch that is driven by a GPIO pin on a processor on the camera PCB.

There may also be depression of a momentary-press release button 312 that disables the MOSFET and hence stops the current in the electromagnet 306, which will release the privacy shutter 310 to the closed position even when the camera is otherwise under normal operation. This provides the user with a convenient manual override to close the camera 302 without having to interact with a TV remote control or their smartphone.

The current drawn by such a solenoid electromagnet is small because it is only used to hold the shutter in place after it has manually been moved to an open state. The forces created by an electromagnet are relatively large when the ferromagnetic material is already in its flux path. This ensures the solenoid can stay on for prolonged periods of time without excessive power wastage or overheating of the solenoid coil. A shutter sensor can also detect the position of the shutter to disable the solenoid current if the shutter is in a closed position and obscuring the camera lens 318.

Figure 4A:
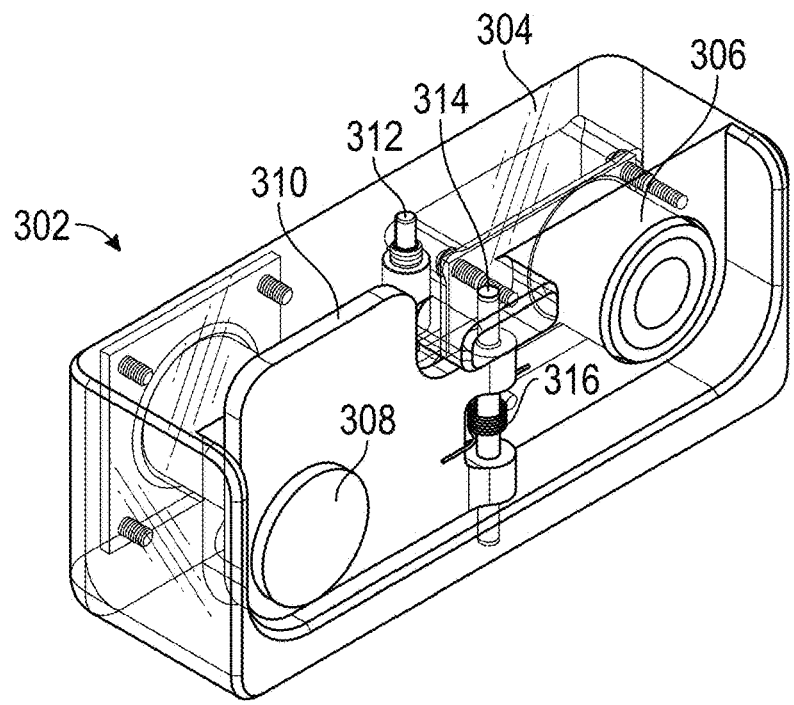
FIG. 4A and FIG. 4B illustrate two internal perspective views of the camera of FIG. 3A and FIG. 3B respectively.
Figure 4B:
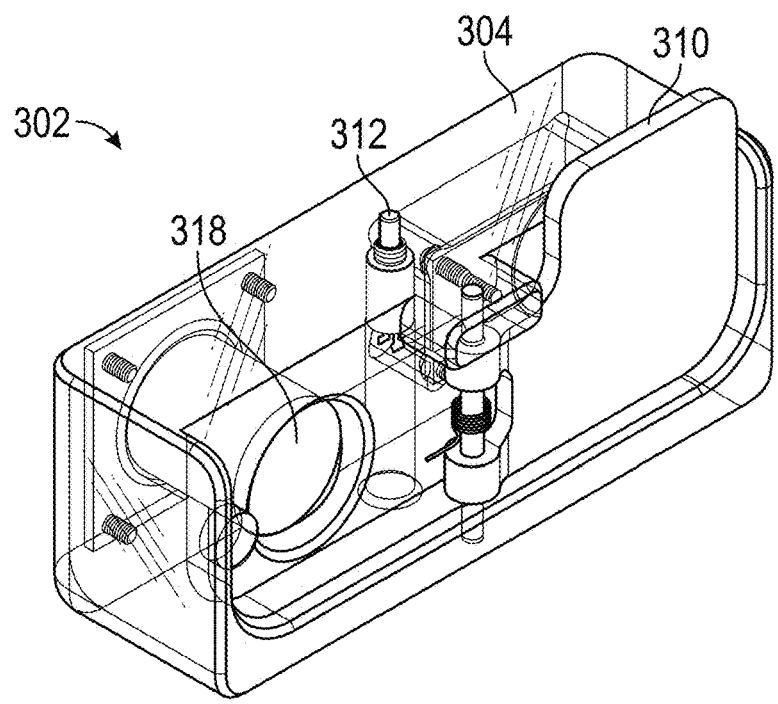

FIG. 4A and FIG. 4B illustrate two internal perspective views of the camera 302 of FIG. 3A and FIG. 3B respectively. As before, camera 302 includes a body 304, an electromagnet 306, a disc of magnetic material 308 mounted to one side of a privacy shutter 310, a release button 312, a rod 314 about which the privacy shutter 310 rotates in use between a camera shielding position illustrated in FIG. 4A and an open position in which a camera lens 318 is exposed. The privacy shutter 310 is biased towards the closed position by a rotary spring 316.

Figure 5A:
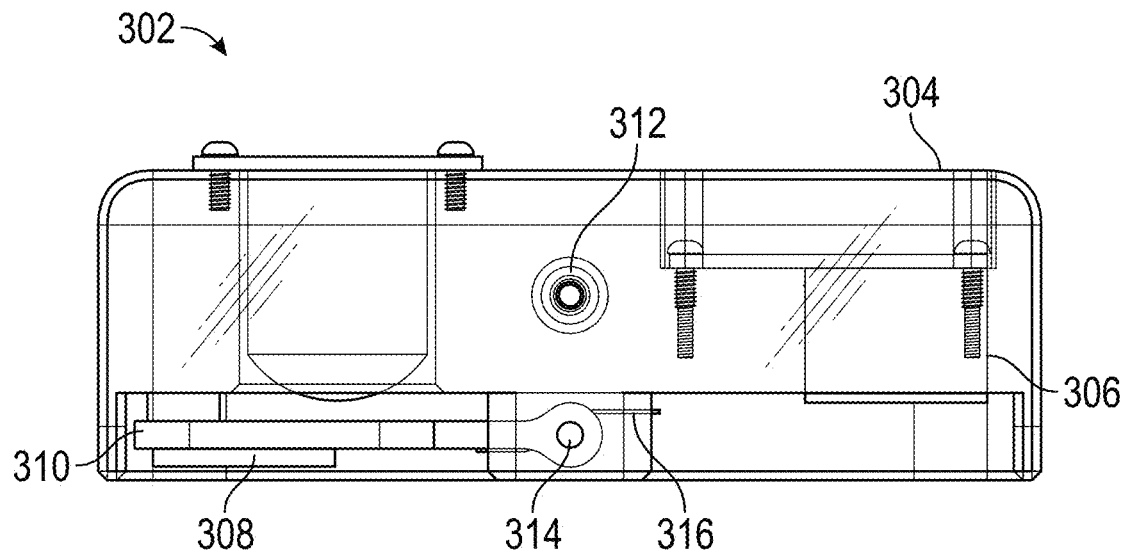
FIG. 5A and FIG. 5B illustrate two internal top views of the camera of FIG. 3A and FIG. 3B respectively.
Figure 5B:
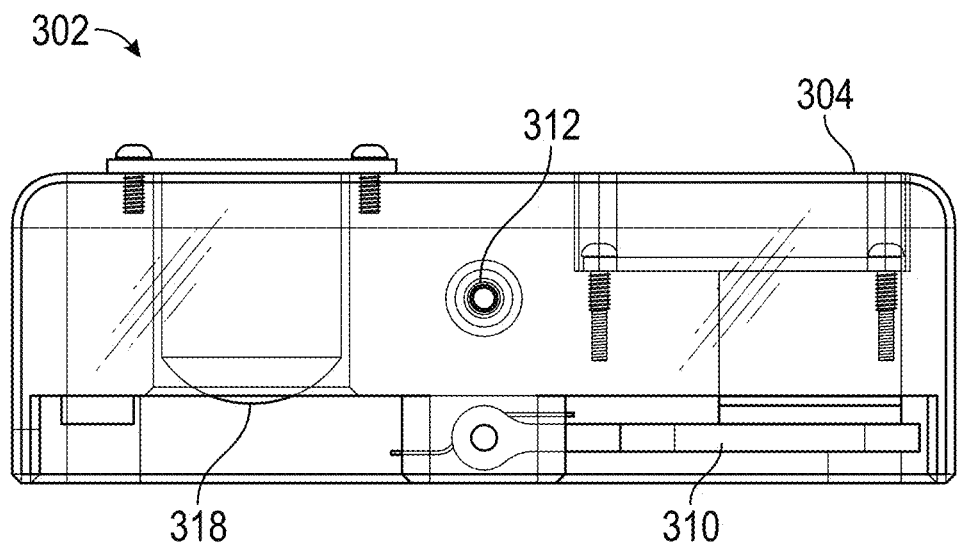

FIG. 5A and FIG. 5B illustrate two internal top views of the camera 302 of FIG. 3A and FIG. 3B respectively. As before, camera 302 includes a body 304, an electromagnet 306, a disc of magnetic material 308 mounted to one side of a privacy shutter 310, a release button 312, a rod 314 about which the privacy shutter 310 rotates in use between a camera shielding position illustrated in FIG. 5A and an open position in which a camera lens 318 is exposed. The privacy shutter 310 is biased towards the closed position by a rotary spring 316.

Figure 6A:
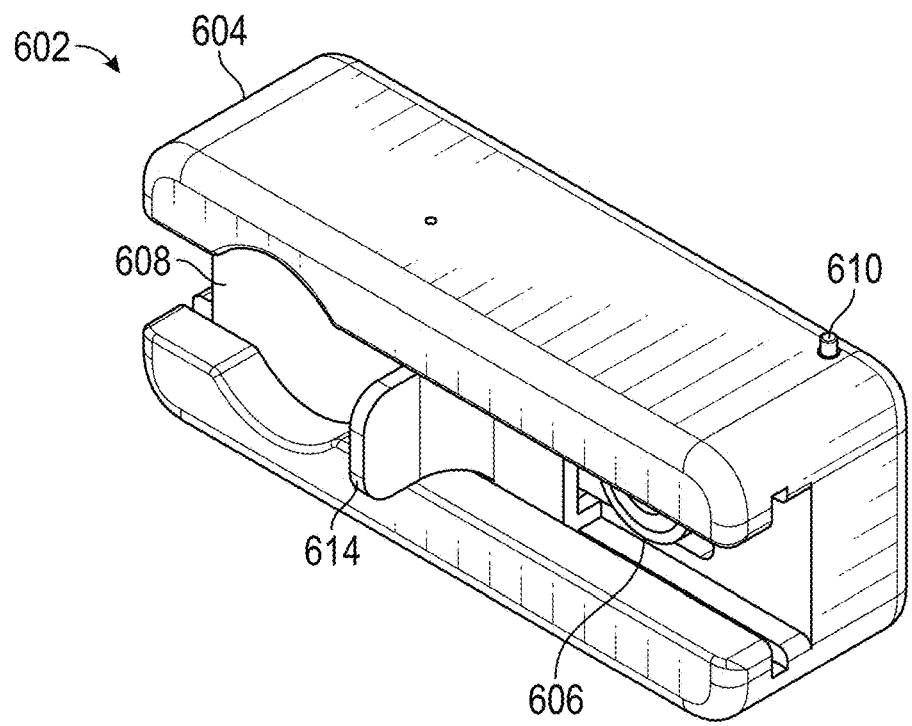
FIG. 6A and FIG. 6B illustrate two perspective views of a camera, according to some examples.
Figure 6B:
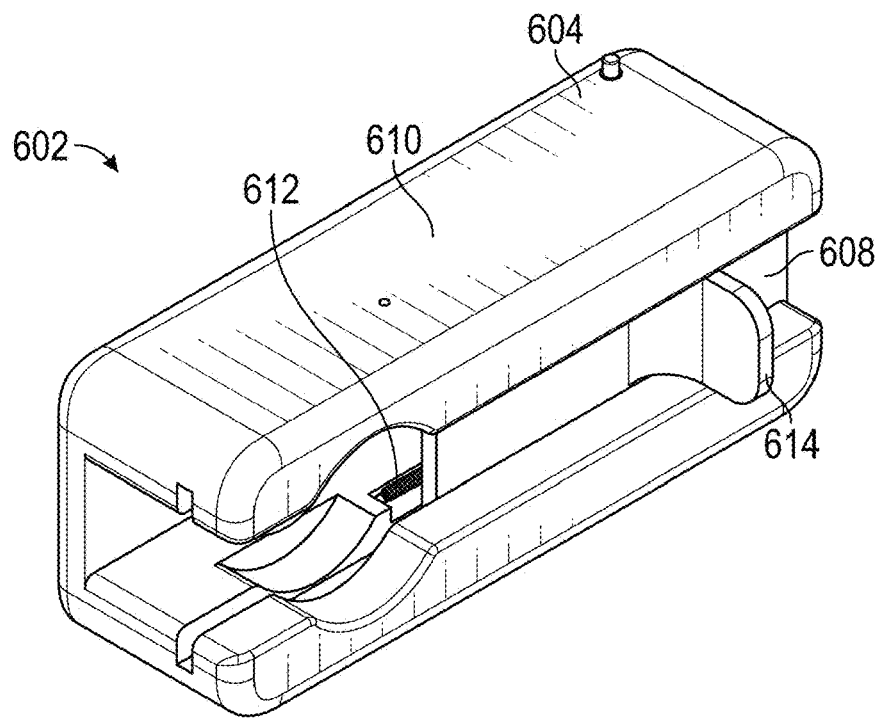

FIG. 6A and FIG. 6B illustrate two perspective views of a camera 602 according to some examples. The camera 602 includes a body 604, an electromagnet 606, a disc of magnetic material 702 (see FIG. 9) mounted to a back side of a privacy shutter 608, a release button 610. The privacy shutter 608 is slidable in grooves in the camera body 604 between a camera shielding position illustrated in FIG. 6A and an open position in which a camera lens is exposed. The privacy shutter 608 is biased towards the closed position by one or more linear springs 612.

When the camera 302 is in use, the privacy shutter 608, after being opened manually, using the tab 614 to the open position shown in FIG. 6B, is held in place by the electromagnet 606, which is activated by a solenoid as before. When the camera 602 is turned off, the solenoid is de-energized and the current provided to the electromagnet 606 is removed. This releases the privacy shutter 608, which was being held in place by the interaction of the electromagnet 606 and the magnetic material 702. The spring 612 then pulls the privacy shutter 608 back to a closed state that physically covers the camera lens 704 as shown in FIG. 7A, as soon as the solenoid is de-energized.

There may also be a momentary-press release button 610 that releases the privacy shutter 608 to the closed position as before, when the camera is under normal operation. This provides the user with a convenient manual override to close the camera 602 without having to interact with a TV remote control or their smartphone.

Figure 7A:
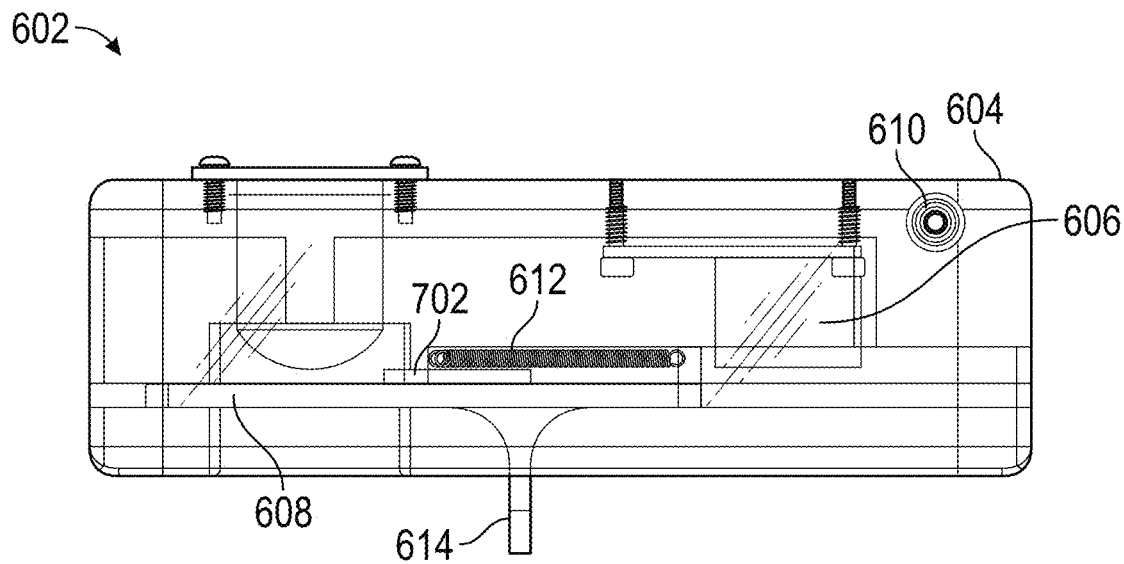
FIG. 7A and FIG. 7B illustrate two internal top views of the camera of FIG. 6A and FIG. 6B respectively.
Figure 7B:
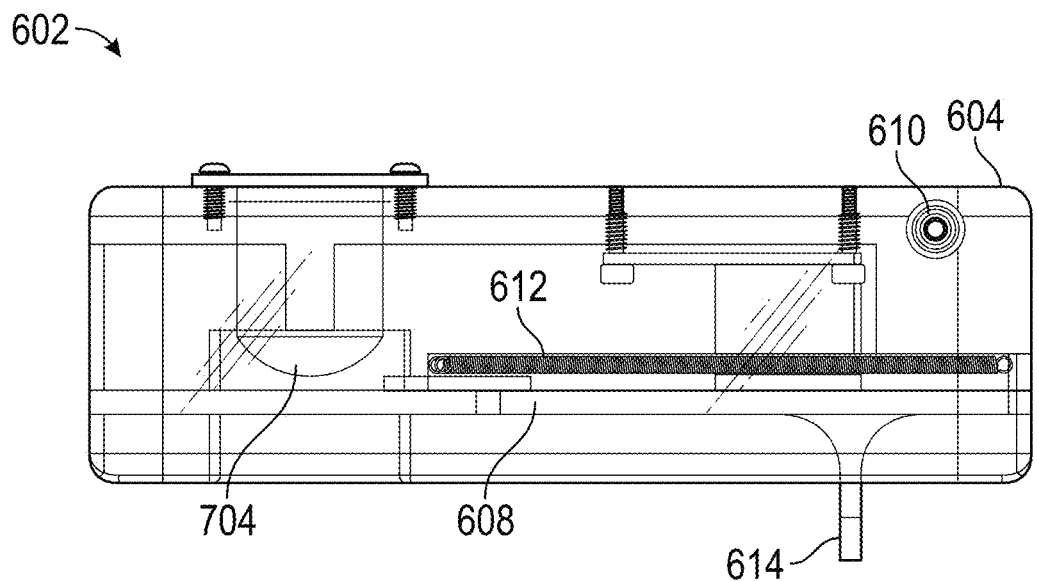

FIG. 7A and FIG. 7B illustrate two internal top views of the camera 602 of FIG. 6A and FIG. 6B respectively. As before, camera 602 includes a body 604, an electromagnet 606, a disc of magnetic material 702 mounted to the back side of a privacy shutter 608, a release button 610, and a tab 614. The privacy shutter 608 is slidable between a camera shielding position illustrated in FIG. 7AA and an open position in which a camera lens 704 is exposed. The privacy shutter 608 is biased towards the closed position by one or more linear springs 612.

Figure 8:
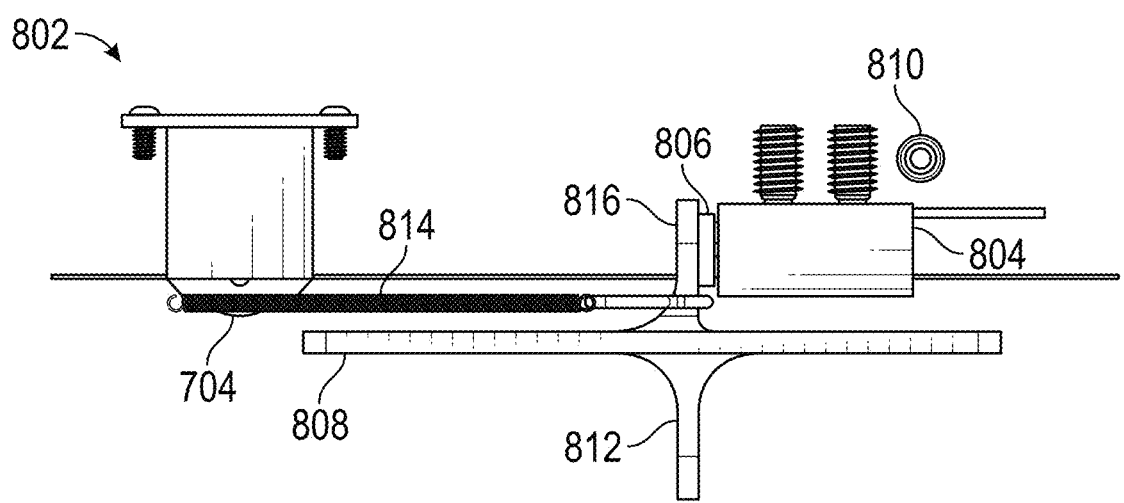
FIG. 8 and illustrates a top view of the arrangements of a camera according to some examples.

FIG. 8 and illustrates a top view of the arrangements of a camera 802 according to some examples. As before, camera 802 includes an electromagnet 804, a disc of magnetic material 806 mounted to one side of a privacy shutter 808, a release button 810, and a tab 812. The privacy shutter 808 is slidable between a camera shielding position and an open position in which a camera lens 704 is exposed. The privacy shutter 808 is biased towards the closed position by means of one or more linear springs 814.

Camera 802 differs from camera 602 in that the electromagnet 804 is mounted in the direction of motion of the privacy shutter 808 instead of perpendicular to it, and the magnetic material 806 is mounted to a tab 816 that is perpendicular to and extends from the privacy shutter 808.

FIG. 9 illustrates a system 900 including an exercise device 102, a server 902, and client devices 904 according to some examples. In various examples, the client devices 904 may include desktop PCs, mobile phones, laptops, tablets, wearable computers, smart televisions or other computing devices that are capable of connecting to the Internet 906 and communicating with the server 902, such as described herein. The client device 904 may be paired with the exercise device 102 using a Bluetooth connection, to provide a user interface by means of which a user of the exercise device 102 can manage the exercise device 102, as well as to receive feedback on their use of the exercise device 102.

A mobile phone or a tablet computer may be a suitable client device 904 for use with the exercise device 102, since these devices have a touch screen for display and user input, a Bluetooth adapter for communication with the exercise device 102, a Wi-Fi adapter for connection to the Internet 906, and a camera and microphone for video communication. An application running on a mobile phone or tablet computer can thus do all the data processing, relaying of logged data to the server 902, as well as streaming of video or other audio content from the internet, and communicating with the users of other exercise devices 102 or with remote personal trainers. Such an application can also be used to control the exercise device 102 to select exercise types and levels, select different user profiles for the exercise device 102, and track and display information about the user's current session and overall progress as shown in FIG. 2.

Another suitable device for use with the exercise device 102 is a set top box 908 with an associated television 916 or monitor. The set top box 908 is a smart, internet-connected device with an inbuilt computer capable of running an application to provide the capabilities described above with reference to the client device 904. Some examples of such a set-top box are Amazon Fire TV cube, Amazon fire TV stick, Google Chromecast TV, and so forth. The television 916 may also be a smart television that has set top box functionality built in, in which case a separate set top box 908 may not be required.

The set top box 908 provides a video signal to the TV over HDMI or other display protocol. The set top box 908 and/or a smart television 916 may be preferred over a smartphone or a tablet because they can be controlled by a remote control 910 that can be used from a distance, provide a larger display, and may be easier to use, especially for the elderly. Wireless connectivity like Bluetooth, Wi-Fi, etc. are typically available on current smart televisions or set-top boxes, or can be easily added via a USB interface. Such connections can again be used to exchange data between remote servers 902, the exercise device 102 and to communicate with workout partners or personal trainers over the Internet 906

For video communication, a camera 210 may be in-built into the set-top set top box 908 or the television 916 TV. Alternatively, a camera with a wired USB interface can be connected to a USB interface on the set-top set top box 908 or smart television 916. Audio output can be provided by earbuds 912 connected to the set top box 908 or the smart television 916, or by wired or wireless speakers 914. A microphone may be built into the camera, the set-top box, may be connected to the set-top set top box 908 via USB, or be included in wireless earbuds connected through Bluetooth.

A camera with a privacy shutter as described herein can of course, depending on the implementation, be connected directly to the television 916 (which may be a smart TV), be a standalone camera with its own power supply and Wi-Fi connection, to transmit a video signal over Wi-Fi to the set top box 908, the television 916, the client device 904, via a local router or the Internet 906, or to a remote participant such as a coach or a workout friend.

FIG. 10 is a flowchart 1000 illustrating a method of operating the camera 210 according to some examples. For explanatory purposes, the operations of the flowchart 1000 are described herein as occurring in serial, or linearly. However, multiple operations of the flowchart 1000 may occur in parallel. In addition, the operations of the flowchart 1000 need not be performed in the order shown and/or one or more blocks of the flowchart 1000 need not be performed and/or can be replaced by other operations. The operations of the flowchart 1000 may be controlled or performed by an embedded processor in the camera 210 or running on one of the other devices in system 900 (see FIG. 9), such as one of the client devices 904, the set top box 908, the server 902and so forth. In some cases the devices may work together to perform the method. For example, an interactive exercise program running on the server 902, the client device 904 or the set top box 908 may receive inputs, such as user input to start an exercise session or a video call, which may then provide an instruction to the camera 210 to enable an electromagnet 306/606/804 to enable a privacy shutter 310/608/808 to be held in the open position.

The method starts at operation 1002 with the camera 210 being powered on. In this initial state, the privacy shutter 310 is closed (obscuring the camera lens), the electromagnet 306 is not receiving power, and the camera 210 is not capturing a video feed. In operation 1004, user input starting a camera session is received. This can be the enablement of camera functionality in a videoconferencing or messaging application, or the enablement of camera functionality in an exercise session associated with the exercise device 102, and so forth. In operation 1008, the user manually opens the privacy shutter until it is held by the electromagnet 306. This step is likely, but functionally optional, since it does not affect the rest of the flowchart 1000, except that in some examples the enablement of the electromagnet in operation 1006 is combined with operation 1008 such that the electromagnet 306 is only enabled once a sensor detects that the privacy shutter is no longer in or has moved away from the closed position.

In operation 1010, the user manually closes the privacy shutter. This step is also optional and can be accomplished by the user pressing the release button 312 or, if the privacy shutter is not held strongly by the electromagnet 306, by moving the privacy shutter 310 away from the open position. Once released from the effect of the electromagnet 306, the privacy shutter moves under the bias of the spring 316 to its closed position and the camera lens is obscured, preventing transmission of video from the field of view of the camera, whether or not the camera session is ongoing.

If the camera is powered off or loses power in operation 1012, the electromagnet disables in operation 1014 and the privacy shutter closes in operation 1016 if it is not already closed. If the camera session ends in operation 1018, the camera receives a notification of this fact and disables the electromagnet 306 in operation 1014 and the privacy shutter closes in operation 1016 if it is not already closed. In some examples the end of a camera session is inferred or determined by the powering down of a related device, such as the exercise device 102 in the case of a camera-enabled exercise session.

The flowchart 1000 will then restart at either operation 1002 if the camera 210's power is off, or operation 1004 if the camera stays powered on until a new camera session starts.

Various examples are contemplated. Example 1 is a camera, comprising: a camera lens; a privacy shutter movable between a first position in which it obstructs the camera lens and a second position in which the camera lens is exposed; a spring biasing the privacy shutter towards the first position; a piece of magnetic material coupled to the privacy shutter; and an electromagnet operable to hold the privacy shutter in the second position by acting on the piece of magnetic material.

In Example 2, the subject matter of Example 1 includes, a switch located on the camera to deenergize the electromagnet in response to user actuation of the switch.

In Example 3, the subject matter of Examples 1-2 includes, wherein the privacy shutter is linearly movable between the first position in which it obstructs the camera lens and the second position in which the camera lens is exposed.

In Example 4, the subject matter of Examples 1-3 includes, wherein the privacy shutter is rotatable between the first position in which it obstructs the camera lens and the second position in which the camera lens is exposed.

In Example 5, the subject matter of Example 4 includes, wherein the camera comprises a rotary spring.

In Example 6, the subject matter of Examples 1-5 includes a sensor to detect the privacy shutter in the first position, the electromagnet being disabled if the sensor is in the first position.

Example 7 is a method of operating a camera including a privacy shutter movable between a first position in which it obstructs a camera lens and a second position in which the camera lens is exposed, a spring biasing the privacy shutter towards the first position, a piece of magnetic material coupled to the privacy shutter, and an electromagnet operable to hold the privacy shutter in the second position by acting on the piece of magnetic material, the method comprising: detecting the starting of a camera session on associated software; and based on the detection of the starting of the camera session, enabling the electromagnet thereby to permit retention of the privacy shutter in the second position.

In Example 8, the subject matter of Example 7 includes, detecting the ending of the camera session on associated software; and based on the detection of the ending of the camera session, disabling the electromagnet.

In Example 9, the subject matter of Example 8 includes, wherein the camera session is an exercise session.

In Example 10, the subject matter of Examples 7-9 includes, wherein the end of the camera session is detected by detecting powering down of an exercise device, and the electromagnet is disabled based on detecting powering down of an exercise device.

In Example 11, the subject matter of Examples 7-10 includes, detecting the privacy shutter in the first position; and preventing enablement of the electromagnet based on detection of the privacy shutter in the first position, regardless of detecting the start of a camera session.

In Example 12, the subject matter of Example 11 includes, permitting enablement of the electromagnet based on detection of the privacy shutter leaving the first position.

Example 13 is at least one machine-readable medium including instructions that, when executed by processing circuitry, cause the processing circuitry to perform operations to implement of any of Examples 1-12.

Example 14 is an apparatus comprising means to implement of any of Examples 1-12. Example 15 is a system to implement of any of Examples 1-12. Example 16 is a method to implement of any of Examples 1-12.

Changes and modifications may be made to the disclosed examples without departing from the scope of the present disclosure. These and other changes or modifications are intended to be included within the scope of the present disclosure, as expressed in the following claims as filed or amended.

What is claimed is:

1. A camera, comprising:
   a camera lens;
   a privacy shutter movable between a first position in which it obstructs the camera lens and a second position in which the camera lens is exposed;
   a spring biasing the privacy shutter towards the first position;
   a piece of magnetic material coupled to the privacy shutter;
   an electromagnet operable to hold the privacy shutter in the second position by acting on the piece of magnetic material; and
   a sensor to detect the privacy shutter in the first position, the electromagnet being disabled if the sensor detects that the privacy shutter is in the first position.

2. The camera of claim 1, further comprising a switch located on the camera to deenergize the electromagnet in response to user actuation of the switch.

3. The camera of claim 2, wherein the privacy shutter is linearly movable between the first position in which it obstructs the camera lens and the second position in which the camera lens is exposed.

4. The camera of claim 3, wherein the camera comprises a rotary spring.

5. The camera of claim 2, wherein the privacy shutter is rotatable between the first position in which it obstructs the camera lens and the second position in which the camera lens is exposed.

6. The camera of claim 5, wherein the camera comprises a rotary spring.

7. The camera of claim 1, wherein the privacy shutter is linearly movable between the first position in which it obstructs the camera lens and the second position in which the camera lens is exposed.

8. The camera of claim 1, wherein the privacy shutter is rotatable between the first position in which it obstructs the camera lens and the second position in which the camera lens is exposed.

\* \* \* \* \*